United States Patent [19]

Keijzer et al.

[11] 3,954,255
[45] May 4, 1976

[54] SUSPENSION STRUT

[75] Inventors: Johan H. Keijzer, Hasselt; Louis J. Jossa, Sint-Truiden; Henri C. J. Vanhove, Gelmen; Francois J. G. Meuleman, Bettincourt, all of Belgium

[73] Assignee: Monroe Belgium N. V., Sint-Truiden, Belgium

[22] Filed: Aug. 30, 1974

[21] Appl. No.: 501,976

[52] U.S. Cl. .............................. 267/34; 267/8 R; 267/65 R; 267/64 R
[51] Int. Cl.² ........................................ B60G 11/56
[58] Field of Search ............... 267/34, 65 R, 65 B, 267/64 R, 64 B, 8 R

[56] References Cited
UNITED STATES PATENTS

| | | | |
|---|---|---|---|
| 3,031,180 | 4/1962 | Sergay | 267/64 B |
| 3,149,829 | 9/1964 | Baum | 267/64 B |
| 3,181,852 | 5/1965 | Paller | 267/8 R |
| 3,353,813 | 11/1967 | Erdmann et al. | 267/34 |
| 3,372,919 | 3/1968 | Jackson | 267/65 B |
| 3,376,032 | 4/1968 | Schmid | 267/65 R |
| 3,603,575 | 9/1971 | Arlasky | 267/34 |

Primary Examiner—James B. Marbert
Attorney, Agent, or Firm—Harness, Dickey & Pierce

[57] ABSTRACT

A vehicle suspension strut for a vehicle having sprung and unsprung portions, the strut including a telescopic shock absorber including a cylinder and a reciprocable piston and piston rod, attachment means for securing the piston rod to one of the vehicle portions and the cylinder to the other of the vehicle portions, first and second spring seats spaced axially of the strut and spaced radially outwardly from the shock absorber, a helical coil spring arranged substantially concentrically of the shock absorber and extending axially between and supported by the spring seats, means defining a variable volume gas chamber with the shock absorber and including a generally tubular-shaped flexible diaphragm member disposed between the radially outer side of the shock absorber and the radially inner side of the coil spring, one end of the diaphragm member being fixedly secured to the shock absorber cylinder and the opposite end of the member being fixedly secured to the piston rod, and means for supplying pressurized gas to and from the chamber to effect expansion and contraction thereof.

14 Claims, 3 Drawing Figures

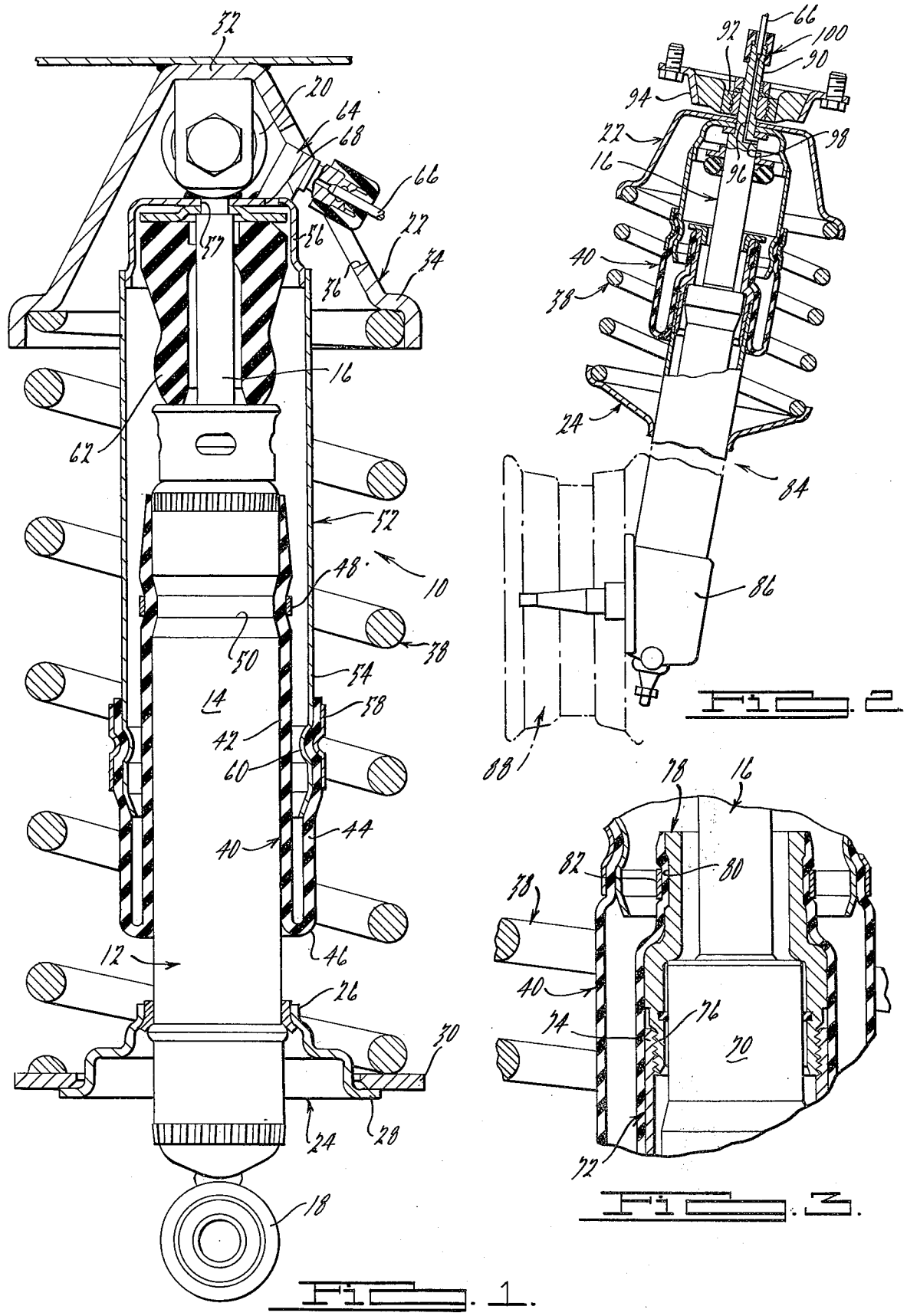

SUSPENSION STRUT

SUMMARY OF THE INVENTION

The present invention relates generally to vehicular suspensions and more particularly, to a new and improved vehicle suspension strut of the type comprising a hydraulic telescopic shock absorber in combination with a helical coil spring extending generally coaxially of the shock absorber and further including means defining an expandable gas chamber to which pressurized gas may be supplied in order to compensate for vehicle loading and supplement the suspension force exerted by the coil spring against the sprung portion of the associated vehicle.

It is accordingly a general object of the present invention to provide a new and improved vehicular suspension strut.

It is a more particular object of the present invention to provide a new and improved suspension strut which features the combination of a helical coil spring and a variable volume chamber defining rolling diaphragm arranged in coaxial relationship so as to minimize to the extreme the possibility of any interference between the associated vehicle components.

It is still another object of the present invention to provide a new and improved suspension strut of the above character wherein the rolling diaphragm may be charged or pressurized whereby to supplement the action of the spring and also function to compensate for vehicle loading.

It is still another object of the present invention to provide a new and improved suspension strut of the above described type that will find universality of installation with various types of shock absorbers and various styles of vehicle suspensions, including independent wheel suspensions.

It is a further object of the present invention to provide a new and improved suspension strut which is of a relatively simple design, is economical to manufacture and will have a long and effective operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view, partially broken away, of a vehicle suspension strut in accordance with one embodiment of the present invention;

FIG. 2 is a longitudinal cross-sectional view, partially broken away, of another embodiment of the present invention; and FIG. 3 is an enlarged fragmentary view of a suspension strut similar to that shown in FIGS. 1 and 2 and illustrates still another embodiment of the present invention.

DESCRIPTION OF THE PREFERRED EMBODIMENTS

Referring now in detail to the drawing and particularly to FIG. 1 thereof, a vehicle suspension strut, generally designated by the numeral 10, is shown as comprising a telescopic direct acting shock absorber 12 including a generally cylindrically shaped housing or cylinder 14 from one end of which extends a reciprocable piston rod 16. As will be appreciated by those skilled in the art, the interior end of the piston rod 16 is operatively connected to a suitable valved piston (now shown) which is cooperable with a quantity of damping fluid within the cylinder or housing 14 in order to damp reciprocal movement of the piston rod relative to the cylinder 14. As is conventional in the art, the shock absorber 12 is provided with lower and upper attachment rings or fittings 18 and 20, respectively, which are adapted to be secured to the unsprung and sprung portions of the vehicle, respectively, by any suitable manner.

The suspension strut 10 is provided with upper and lower spring seats 22 and 24 which are spaced longitudinally or axially of the shock absorber 12 and the lower of which includes an inner peripheral portion 26 adapted to be fixedly secured to the exterior of the shock absorber housing 14, as illustrated in FIG. 1. The lower spring seat 24 also includes a generally radially disposed shoulder 28 which is spaced radially outwardly from the housing 14 and may be provided with a suitable bearing or support plate 30 which functions in a manner hereinafter to be described. The upper spring seat 22 is of a generally cup-shaped configuration and includes an upper attachment or fastening portion 32 adapted to be fixedly secured, as by welding or the like, to the sprung portion of the vehicle. The upper spring seat 22 further includes a generally radially disposed shoulder 34 and is also formed with an access opening 36 in one side thereof which functions in a manner hereinafter to be described. Extending generally coaxially of the shock absorber 12 and spaced radially outwardly therefrom is a helical coil spring, generally designated by the numeral 38. The lower end of the spring 38 is supported or bears upon the plate 30, while the upper end thereof is adapted for engagement with the shoulder 34 of the upper spring seat 22. By this configuration, the spring 38 and shock absorber 14 provide a unitized assembly that may be conveniently installed in a vehicle and which will assume a minimum amount of space, so as to reduce to the extreme the possibility of interference with adjacently located portions of the vehicle.

In accordance with the present invention, the suspension strut 10 is provided with a rolling diaphragm element, generally designated by the numeral 40, which cooperates with the shock absorber 12 in defining a variable volume chamber to which pressurized fluid may be selectively supplied so as to not only supplement the action of the coil spring 38 in resiliently supporting the sprung portion of the associated vehicle, but also function to compensate for variations in vehicle loading. The diaphragm 40 is of a generally elongated tubular configuration and is fabricated of any suitable material, such as synthetic or natural rubber which may, if desired, be reinforced by a suitable fabric or the like. When installed on the suspension strut, the diaphragm 40 includes an inner part or portion 42 which is contiguously engaged with the outer periphery of the cylinder 14 and is integrally connected to an outer part or portion 44 by means of a reversely folded portion 46. As illustrated, the inner portion 42 of the diaphragm 40 is secured by a suitable clamping ring or the like 48 within a recessed portion 50 formed in the shock absorber housing 14. The outer portion 44 of the diaphragm 40 is sleeved over the lower end of a dirt shield assembly 52 which comprises a generally cylindrically shaped section 54 and a generally cup-shaped section 56, the sections being fixedly secured to one another in a manner best seen in FIG. 1, as by welding or the like. The cylindrical section 54 of the dirt shield 52 extends coaxially of the shock absorber 12 in a position spaced radially between the inner periphery of the spring 38 and the outer periphery of the cylindrical housing 14, with the outer portion 44 of the diaphragm 40 being disposed around the outer periphery of the lower end of the cylindrical section 54 and being secured thereon by means of a clamping ring 58 which is aligned generally with a recess portion 60 of the cylindrical section 54. The upper end of the cup-shaped section 56 of the dirt shield 52 is formed with a central opening 57 through which the upper end of the piston rod 16 extends, with a suitable compression bumper or stop 62 being disposed between the underside of the upper end of the dirt shield 52 and the upper end of the cylindrical housing 14 of the shock absorber 12 as may be conventional in the art.

It will be seen that the dirt shield 52 and rolling diaphragm 40 form a variable volume chamber with the shock absorber 12, which chamber can be selectively pressurized in order to effect expansion thereof and thus compensate for loading of the associated vehicle and/or assist the resilient force by the spring 38 against the sprung portion of the vehicle. Means for thus pressurizing the chamber defined by the dirt shield 52 and diaphragm 40 is preferably, although not necessarily, provided by a fitting assembly 64 which is accessible through the aforementioned access opening 36 in the upper spring seat 22. The fitting assembly 64 may be of any suitable construction so as to operatively connect a suitable conduit 66 with a flow port or passage 68 formed in the cup-shaped upper section 46 of the dirt shield 52, the conduit 66 being communicable with a suitable source of compressed fluid, such as compressed air supplied by an engine or otherwise powered air compressor on the vehicle. Thus, at such time as the compressor is energized, compressed air will be supplied through the conduit 66, fitting assembly 64, and passage 68 with the interior of the aforementioned variable volume chamber to effect pressurization thereof and thus compensate for vehicle loading and/or supplement the action of the spring 38, as above described. Similarly, at such time as the conduit 66 is communicable with a pressure that is lower than the pressure within the aforementioned chamber, for example, with atmosphere, the variable volume chamber will contract to reduce the effective force which is exerted by the compressed air within the chamber, as will be appreciated by those skilled in the art.

As previously mentioned, the shock absorber 12 may be of various constructions and may, as illustrated in FIG. 3, be of the type consisting of a removable or replaceable cartridge, designated by the numeral 70 in FIG. 3. Typically, such cartridge type shock absorbers would comprise a piston rod, such as the aforementioned rod 16, and be contained within a generally cylindrical or tubular housing, herein designated by the numeral 72. The upper end of the housing 72 is provided with an internally threaded upper end section 74 adapted to threadably receive or engage the lower threaded portion 76 of a fitting 78 to which the inner portion 42 of the rolling diaphragm 40 is operatively secured, for example, by being compressingly engaged between a reduced diameter or recessed area 80 of the fitting 78 and a suitable clamping ring 82. With this construction, replacement of the diaphragm 40 and/or shock absorber cartridge 70 may be easily replaced merely by removing the fitting 78 from the associated housing 72.

As shown in FIG. 2, the principles of the present invention are readily applicable to independent wheel suspensions or MacPherson type suspension struts generally designated in FIG. 2 by the numeral 84. In such type of wheel suspension, a wheel spindle or stub axle 86 is provided on the lower end of a shock absorber housing, such as the aforementioned housing 72 and is adapted to rotatably support an associated vehicle wheel 88 thereon. In the event the wheel suspension 84 is to be utilized at the front or steerable wheel of the vehicle, it may be desirable to have the upper end of the piston rod 16, herein designated by the numeral 90, rotatably mounted by means of a suitable anti-friction bearing or the like 92 relative to the associated chassis portion, representatively designated by the numeral 94. It is contemplated that the piston rod 16 be provided with a longitudinally extending bore 96 that is communicable at its lower end with a cross bore 98 which is in turn communicable with the interior of the variable volume chamber defined by the diaphragm 40. A suitable fitting assembly 100, similar to the aforementioned fitting assembly 64, may be provided on the outer end of the piston rod 16 for operatively connecting the conduit 66 to the aforementioned chamber.

It will be seen from the foregoing that the present invention provides a novel suspension strut which will find universality of application with various types of shock absorber designs, as well as in various types of vehicle suspensions. By virtue of the novel combination of the variable volume chamber with the helical coil spring, the suspension strut of the present invention will serve the two-fold purpose of compensating for vehicle loading as well as compensating when relatively "soft" springs may be either installed as replacement items on the vehicle suspension or when the original equipment springs become worn and require some type of supplemental help. Additionally, by virtue of the unique concentric arrangement embodied in the present invention, the suspension strut thereof will not require excessive space and hence will be compatible with existing vehicle suspensions.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. In a vehicle suspension for a vehicle having sprung and unsprung portions,
    a combination shock absorber and adjustable leveling strut having a body comprising a telescopic shock absorber having a cylinder and a reciprocal piston and piston rod,
    attachment means for securing said piston rod to one of the vehicle portions and said cylinder to the other of said vehicle portions,
    first and second spring seats spaced axially of said strut and spaced radially outwardly from said shock absorber,
    said first spring support being fixedly secured relative to said sprung portion of the vehicle and said second spring support being fixedly secured directly to the body of said strut,
    a helical coil spring arranged substantially concentrically of said shock absorber and extending axially between and supported by said spring seats, whereby said shock absorber and spring may be removed from a vehicle as a unit and without requiring disassembly of the spring from around the shock absorber, an elongated cylindrical dirt shield extending around the outer periphery of said piston rod and said cylinder and secured at one end thereof for telescopic movement relative to said cylinder, said dirt shield being located radially between the outer periphery of said cylinder and the inner periphery of said spring, a generally tubular-shaped flexible diaphragm member disposed between the radially outer side of the shock absorber and the radially inner side of said coil spring, said diaphragm member defining a variable volume gas chamber with said dirt shield and including a radially inner part sleeved directly upon and secured to a portion of the outer periphery of said cylinder, a radially outer part secured to said dirt shield and an integral rolling reversely folded part connecting said radially inner and outer parts, and means defining a fluid passage for selectively supplying pressurized gas to and from said chamber to effect expansion and contraction thereof.

2. The invention as set forth in claim 1 wherein said dirt shield includes a radial portion extending between said piston rod and said cylindrical section, and which includes fluid fitting means for communicating pressurized gas into said variable volume chamber.

3. The invention as set forth in claim 1 wherein said wheel suspension is an independent suspension.

4. The invention as set forth in claim 1 wherein said wheel suspension is of the MacPherson type.

5. The invention as set forth in claim 1 which includes a generally tubular-shaped housing adapted to nestingly receive said shock absorber, and wherein one end of said diaphragm member is operatively connected to said housing.

6. The invention as set forth in claim 5 wherein one of said spring seats is fixedly secured to the exterior of said housing and extends radially outwardly therefrom.

7. The invention as set forth in claim 2 wherein said fitting is accessible through said upper spring seat.

8. The invention as set forth in claim 2 wherein one end of said diaphragm member is sleeved over the lower end of said cylindrical section of said dirt shield and is clampingly secured thereon.

9. The invention as set forth in claim 1 which includes clamping ring means for fixedly securing one end of said diaphragm member to the outer surface of said shock absorber.

10. The invention as set forth in claim 5 which includes attachment means fixedly secured to one end of said diaphragm and adapted to be removably and detachably connected to said housing.

11. The invention as set forth in claim 2 wherein the diameter of said cylindrical section of said dirt shield is larger than the inner end of said diaphragm member and is smaller than the diameter of said spring.

12. The invention as set forth in claim 1 which includes fluid passage means extending through said piston rod and communicating a source of fluid pressure with the interior of said variable volume chamber.

13. The invention as set forth in claim 2 wherein said fitting is fixedly secured to said dirt shield and wherein said dirt shield includes fluid passage means communicating said fitting with the interior of said chamber.

14. The invention as set forth in claim 1 wherein said shock absorber is in the form of a replaceable cartridge.

* * * * *